United States Patent [19]
Goto et al.

[11] 3,987,776
[45] Oct. 26, 1976

[54] COMBUSTION CHAMBER STRUCTURE FOR A SPARK IGNITION ENGINE

[75] Inventors: Kenji Goto; Takao Niwa, both of Susono, Japan

[73] Assignee: Toyota Jidosha Kogyo Kabushiki Kaisha, Japan

[22] Filed: Apr. 5, 1974

[21] Appl. No.: 458,418

[30] Foreign Application Priority Data
June 21, 1973 Japan .......................... 48-72735[U]
Jan. 17, 1974 Japan .......................... 49-7717[U]

[52] U.S. Cl. .................... 123/191 R; 123/193 C; 123/DIG. 4; 123/193 CH
[51] Int. Cl.² ......................................... F02B 23/10
[58] Field of Search ............ 123/30 C, 30 D, 32 ST, 123/75 B, DIG. 4, 191 R, 193 H, 193 CH

[56] References Cited
UNITED STATES PATENTS

| | | | |
|---|---|---|---|
| 386,210 | 7/1888 | Nash | 123/32 ST |
| 401,453 | 4/1889 | Nash | 123/191 R |
| 418,417 | 12/1889 | Nash | 123/191 R |
| 620,941 | 3/1899 | Lewis | 123/191 R |
| 640,675 | 1/1900 | Lewis | 23/191 R |
| 1,286,435 | 12/1918 | Slate | 123/191 R |
| 2,055,814 | 9/1936 | Dennison | 123/193 CH |
| 2,062,013 | 11/1936 | Opolo | 123/193 CH |
| 2,886,024 | 5/1959 | Elias | 123/191 SP |
| 3,170,445 | 2/1965 | Folcke | 123/32 ST |
| 3,820,523 | 6/1974 | Showalter et al. | 123/191 R |

FOREIGN PATENTS OR APPLICATIONS

| | | | |
|---|---|---|---|
| 150,188 | 7/1937 | Austria | 123/193 H |
| 108,995 | 2/1928 | Austria | 123/191 R |
| 969,429 | 12/1950 | France | 123/191 R |
| 784,201 | 7/1935 | France | 123/191 R |
| 688,122 | 10/1930 | France | 123/191 R |
| 812,026 | 4/1937 | France | 123/191 R |

*Primary Examiner*—Charles J. Myhre
*Assistant Examiner*—William C. Anderson
*Attorney, Agent, or Firm*—Kenyon & Kenyon

[57] ABSTRACT

A spark ignition engine of the carburetor single chamber type stratified charge combustion system wherein air and rich mixture are supplied successively by the same path, comprising a barrier arranged in the combustion chamber for directing the intake gas flow, said barrier projecting from the wall of the combustion chamber into the interior of the combustion chamber, whereby the air and rich mixture are positively stratified in the order in which they are drawn into the combustion chamber.

17 Claims, 10 Drawing Figures

COMBUSTION CHAMBER STRUCTURE FOR A SPARK IGNITION ENGINE

FIELD OF THE INVENTION

The present invention relates to spark ignition engines employing a carburetor and wherein charge stratification is produced when air (or lean mixture) and a rich mixture are supplied to the cylinder, in other words, what is known as a spark ignition engine of the carburetor single chamber type stratified charge combustion system (referred to below simply as a stratified charge combustion system engine). In particular, the present invention relates to combustion chamber constructions in stratified charge combustion system engines wherein after air has first been supplied a rich mixture is supplied by the same path.

DESCRIPTION OF THE PRIOR ART

In comparison to other known combustion systems, the above stratified charge combustion system has better ignition characteristics, and, owing to complete combustion, reduces the amount of injurious components of exhaust gas, etc., so that from these points of view it is an effective system for preventing pollution. With this system, for the intake system, there have been proposed systems wherein the air and rich mixture are supplied by separate paths, and systems wherein, as mentioned above, the air and rich mixture are supplied successively by the same path. However, in the case of conventional engines of the latter intake system, due to the construction of the combustion chamber, the speed of air intake flow in the intake stroke after the air has passed the air intake valve is high in the neighborhood of the circumference near the wall of the cylinder but low in the central region. Consequently, eddies are formed in the volume of the stroke, with the result that when the air and rich mixture are supplied successively, they mix, giving rise to the problem of insufficient stratification.

SUMMARY OF THE INVENTION

An object of the present invention is to eliminate the aforementioned disadvantages in a stratified charge combustion engine of the system wherein air and rich mixture are successively supplied by the same path. That is, the present invention is intended, by making the speed of the air and rich mixture drawn into the stroke volume through the combustion chamber from the air intake valve during the intake stroke to be equal at all points on a plane normal to the flow, to prevent the formation of eddies within the stroke volume, thus positively achieving stratification without mixing of the air and rich mixture.

In order to achieve the above object, with an engine according to the present invention, in the combustion chamber there is provided in the neighborhood of the opening end of the combustion chamber, a barrier projecting from the wall of the combustion chamber to the interior of the combustion chamber. The effect of this barrier is to check the fast flow, in the neighborhood of the periphery of the cylinder, of intake gases (air and rich mixture) drawn in from the intake valve during the intake stroke, thus making the speed of the intake flow, which is drawn past this barrier into the stroke volume, approximately uniform.

The shape of the barrier is designed depending mainly on the shape of the combustion chamber, that is, for example, hemisphere-shape, polysphere-shape, bathtub-shape, wedge-shape, and so on. For the hemisphere-shaped and the polysphere-shaped combustion chambers (hereinafter referred to as the hemisphere-shape combustion chamber), it is effective to provide an annulus shaped barrier extending along the entire periphery of the opening end of the combustion chamber. However, for the hemisphere-shaped combustion chamber, a barrier which is formed by removing or changing the shape of the part of the annulus on the intake valve side, is more preferable.

For the bathtub-shaped and the wedge-shaped combustion chambers (hereinafter referred to as the bathtub-shaped combustion chamber), it is effective to provide a barrier which extends along the periphery of the opening part of the combustion chamber on the intake valve side.

The barrier can be constructed as an independent member distinct from the constructional parts of the combustion chamber, namely, the cylinder head or cylinder, or it may be constructed as a member formed as a unit with these. By means of a combustion chamber construction provided with such a barrier, the formation of eddies in the stroke volume is prevented, and the air and rich mixture are positively stratified in the order in which they are drawn in.

The present invention is explained in detail below by way of example, with reference to the accompanying drawings.

DESCRIPTION OF THE PREFERRED EMBODIMENTS

Figure 1:
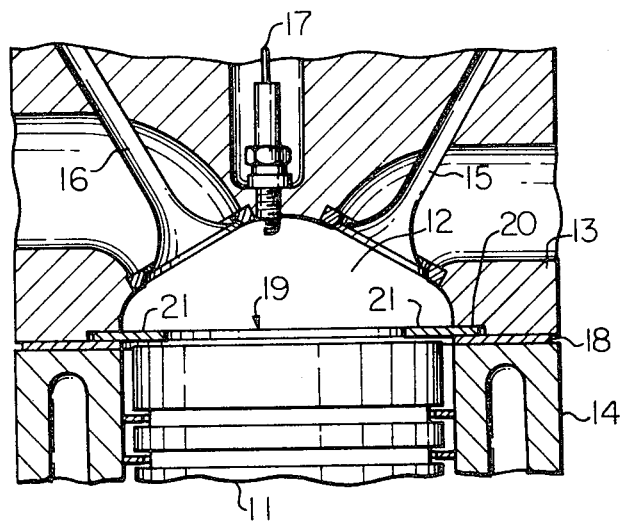
FIG. 1 is a cross-sectional view of a hemisphere-shaped combustion chamber construction of a first embodiment according to the present invention.

Referring to the drawings, some constructional elements, namely, a piston 11, a combustion chamber 12, a cylinder head 13, a cylinder block 14, an intake valve 15, an exhaust valve 16, an ignition plug 17, and a gasket 18, are well-known and, therefore, an explanation thereof is dispensed with.

FIG. 1 illustrates a first embodiment, according to the present invention, of a hemisphere-shaped combustion chamber construction in a stratified charge combustion engine. As shown in FIG. 1, the hemisphere-shaped combustion chamber has a substantially spherical surface. The intake valve 15 is disposed at the upper position of the combustion chamber 12, and it is oblique in attitude relative to the lower end surface of the cylinder head 13. In this construction, the intake gas is drawn obliquely into the combustion chamber 12 from the upper position thereof, relative to the lower end surface of the cylinder head 13, and then flows along said spherical surface of the combustion chamber 12. As a result, the speed of the intake gas flow is high in the peripheral region near the wall of the combustion chamber and low in the central region.

The characteristic of the embodiment shown in FIG. 1 is that the construction is provided with a barrier plate 19 at the opening part of the combustion chamber 12. The barrier plate 19 is shaped as a flat annular plate provided with a hole in its center with a diameter of a little less than the internal diameter of the cylinder, its peripheral edge being inserted into a groove 20 formed in the periphery of the open end of the cylinder head 13, and held between the cylinder head 13 and gasket 18 by tightening the cylinder head 13 and the cylinder block 14. Thus the part of the barrier plate 19, which projects from the wall of the combustion chamber 12 into the interior of the combustion chamber, acts as a barrier part 21 directing the flow of intake gas. Barrier part 21 extends along the entire periphery of the opening part of the combustion chamber 12. The degree of projection of the barrier part 21 from the wall of the combustion chamber, that is, the height of the barrier, differs from one engine to another, but in general about 5 mm is suitable.

The effect of this barrier part 21 will now be explained.

When the piston 11 descends during the intake stroke of the engine, first air, and then rich mixture enters from the intake valve 15. The intake gas which has passed through the intake valve 15 flows along the spherical surface of the combustion chamber 12, and the speed of the intake gas flow is high in the peripheral region near the wall of the combustion chamber and low in the central region. However, the flow in the peripheral region is obstructed by the barrier part 21, which changes the direction of the flow and slows it down. That is, the flow of intake gas drawn from the combustion chamber 12 into the interior of the stroke volume is corrected by the barrier part 21 so that the speed of flow is uniform at all points on a plane normal to the flow. Consequently, since the formation of eddies in the stroke volume is prevented, the air and rich mixture which are successively drawn in do not mix, and the charge is properly stratified in the order in which it is drawn in.

Figure 2:
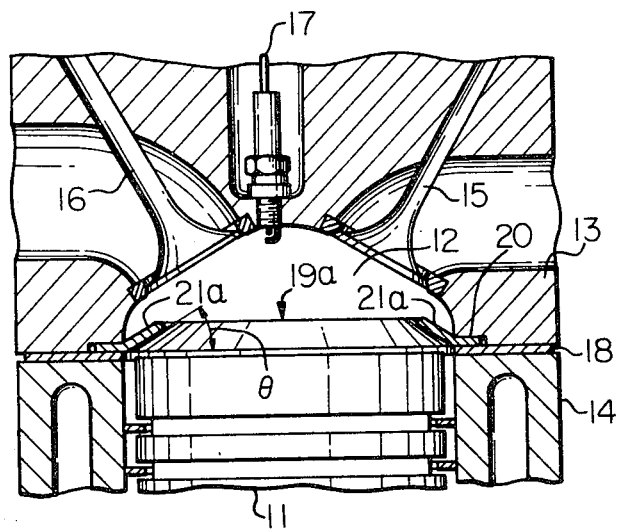
FIG. 2 and FIG. 3 are, respectively, cross-sectional views similar to FIG. 1 showing different examples of variation of the shape of the annular plate in the first embodiment.
Figure 3:
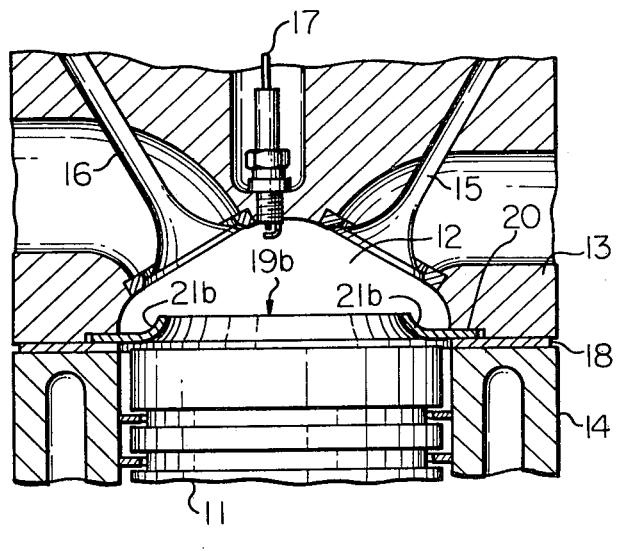

Examples of different shapes which may be used for the barrier plate 19 of the embodiment of FIG. 1 are shown in FIG. 2 and FIG. 3. In the case of a barrier plate 19a of FIG. 2, the barrier part 21a has a shape inclined to the combustion chamber 12 in the upward direction at an angle $\theta$ relative to the cylinder head lower end-surface. The angle $\theta$ may be about 30 — 45°. With such a shape of the barrier, while the resistance to the flow near the periphery becomes larger, the angle to the barrier 21 of the flow which has passed the barrier becomes a small angle less than 90°, so that the slight eddies which are formed immediately after the barrier part 21 are reduced, and the stratification is further improved. A barrier plate 19b shown in FIG. 3 is shaped so that the barrier part 21b has a certain amount of curvature. In this case the "peeling off" of the flow which has passed the barrier part 21 is almost completely prevented so that the production of slight eddies immediately after said barrier part is minimal, and the stratification is further improved.

Also with the hemisphere-shaped combustion chamber construction of FIG. 1, the intake valve 15 is disposed at the obliquely upper position of the combustion chamber 12. Due to this disposition of the intake valve 15, the deflection of the intake gas flow drawn into the combustion chamber 12 is larger on the side farthest from the exhaust valve 16, but smaller on the side nearest the exhaust valve 16, consequently, the speed of the intake gas flow in the peripheral region slows down on the intake valve side, but does not slow down as much on the exhaust valve side. As a result, the difference of speed of intake gas flow in the peripheral region can be seen, although said difference in the speed is in fact relatively small. In order to eliminate this difference of speed, it is effective to provide a barrier which has a partially varied shape on the intake valve side. Examples of these variations in shape are shown in FIGS. 4 and 5.

Figure 4:
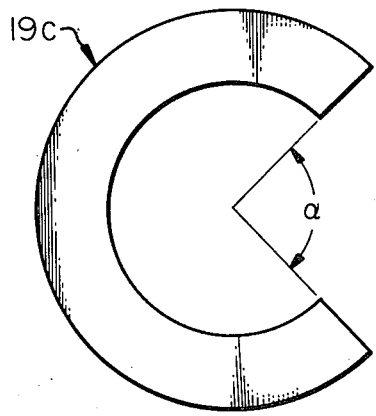
FIGS. 4, 5 and 6 illustrate, respectively, different examples of variation in the shape of the annular plate in the first embodiment.

A barrier plate 19c of FIG. 4 is formed by removing a part of the intake valve side from the annulus similar to the plate 19 in FIG. 1, subtending an angle $\alpha$. The angle $\alpha$ may be suitably chosen within 80° –180°, depending on the disposition of the intake valve 15.

Figure 5:
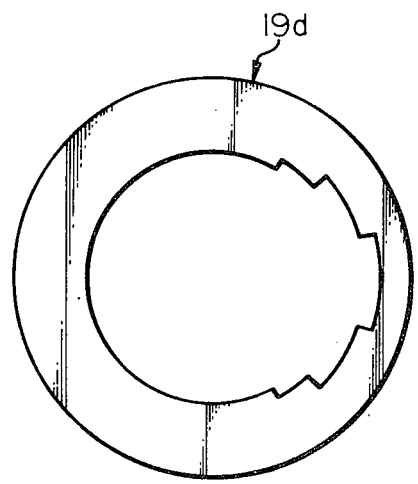

A barrier plate 19d of FIG. 5 is basically annular and is formed with a stepwise variation in the height of the barrier portion on the intake valve side. Otherwise, the variation in the height of the barrier part may be in a straight line or a curved line.

In a case wherein said barrier plate 19c or 19d is provided, the fast flow of the intake gas on the side of the exhaust valve 16 is obstructed by the barrier part of the plate 19c or 19d, but the slow flow on the side of the intake valve 15 is substantially not obstructed. As a result, the difference in speed in the peripheral region is eliminated and, thus, the formation of eddies can be prevented with more certainty.

Figure 6:
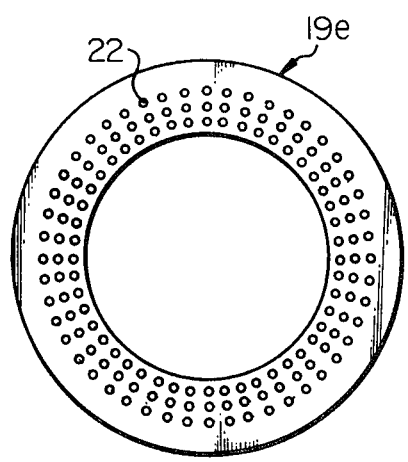

Furthermore, as shown in FIG. 6, a barrier plate 19e of a construction provided with a plurality of round, rectangular or other arbitrarily shaped holes may be employed. It is preferable that the shape and arrangement of the holes should be such that the resistance to passage of the charge is high in the vicinity of the periphery and comparatively low in the region of the inside edge of the plate. This may be achieved by any of the following methods: I) while keeping the density of the hole distribution constant, making the size of the holes less in the neighborhood of the periphery and larger in the neighborhood of the inside edge of the plate; II) keeping the size of the holes constant but making the hole distribution sparse in the neighborhood of the periphery and dense in the neighborhood of the inside edge of the plate; or III) combining these, making the holes small and sparse in the neighborhood of the periphery and large and dense in the neighborhood of the inside edge of the plate. Since, in the construction of the barrier plate 19e, by arbitrary combination of the size and density of distribution of the holes, the resistance to passage of charge can be freely selected, the formation of eddies during the intake stroke can be practically completely prevented by proper design.

Figure 7:
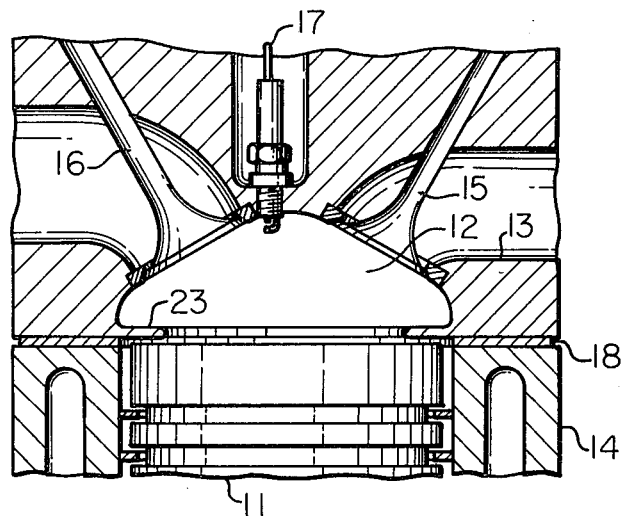
FIGS. 7 and 8 are, respectively, cross-sectional views similar to FIG. 1, showing other examples of the barrier according to the present invention.
Figure 8:
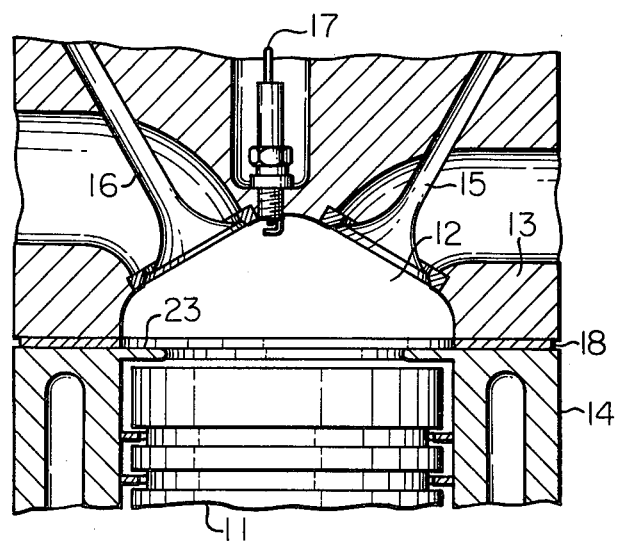

The examples in the above FIGS. 1 to 6 are methods of forming a barrier inside the combustion chamber by using an independent barrier plate. However, as is respectively shown in FIGS. 7 and 8, a barrier part 23 may be made as a unit with the cylinder head 13 or the cylinder block 14. It will be clear that in this case the shape of barrier part 23 may be any of the shapes shown in FIGS. 1 to 6.

Figure 9:
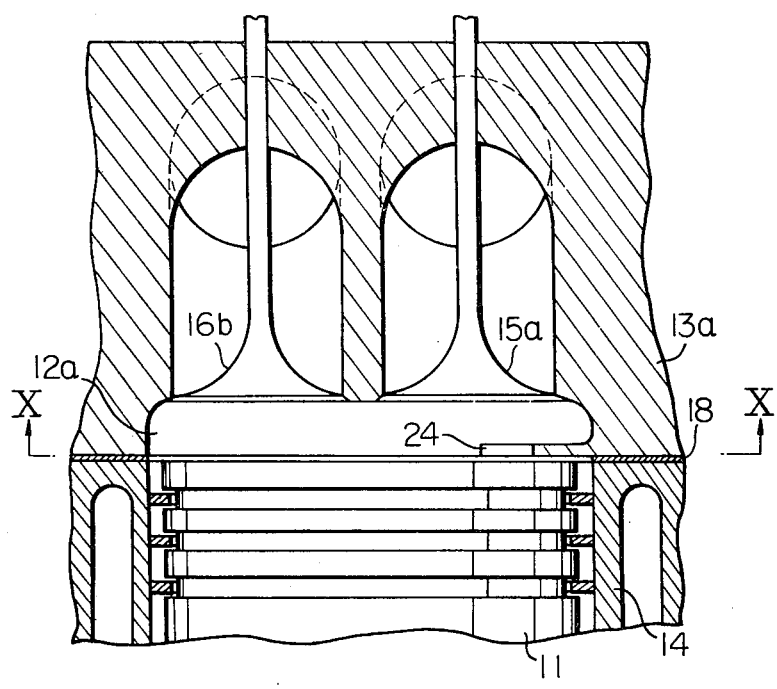
FIG. 9 is a cross-sectional view of a bathtub-shaped combustion chamber construction of another embodiment according to the present invention.
Figure 10:
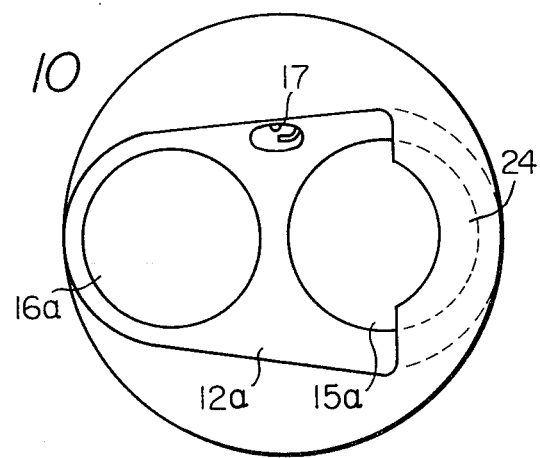
FIG. 10 is a view taken along line X—X in FIG. 9.

In FIGS. 9 and 10, a bathtub-shaped combustion chamber construction is shown, according to the present invention. As shown in the above figures, the bathtub-shaped combustion chamber 12a has a substantially flat surface. The intake valve 15a is disposed at the right side of the upper position of the combustion chamber 12a, and it is upright in attitude relative to the lower end surface of the cylinder head 13a. In this construction, the intake gas is drawn uprightly into the combustion chamber 12a from the upper position thereof, relative to the lower end surface of the cylinder head 13a, and then flows along said flat surface of the combustion chamber 12a. Therefore, the deflection of the intake gas flow drawn into the combustion chamber 12a is substantially uniform, and the result is that the difference of speed due to the deflection of the flow cannot be seen.

However, due to the disposition of the intake valve 15a, the distance from the intake valve 15a to the peripheral wall of the combustion chamber is shorter on the opposite side of the exhaust valve 16a side, and longer on the side of said exhaust valve 16a. Accordingly, the intake gas flow drawn into the combustion chamber 12a is, on the opposite side of the side of the intake valve 15a, maintained at relatively high speed, while it slows down on the side of the exhaust valve 16a, since the intake gas diffuses over a long distance. This matter is counter to that mentioned above in connection with the hemisphere-shaped combustion chamber.

The bathtub-shaped combustion chamber construction according to the present invention is, as shown in FIGS. 9 and 10, provided with a barrier part 24 which extends along the periphery of the opening end of the combustion chamber 12a on the intake valve side. The barrier part 24 is made as a unit with the cylinder head 13a, and projects into the combustion chamber 12a at a right angle relative to the wall of the cylinder. The degree of projection of the barrier part 24 from the wall of the combustion chamber, that is, the height of the barrier part, differs from one engine to another, but in general about 5 – 10 mm is suitable.

In this construction, the aforementioned fast flow of the intake gas on the side of the intake valve 15a is obstructed by the barrier part 24, and, thus, the speed of said flow slows down. Therefore, the difference of the speed of the flow on the intake valve side from that of the flow on the exhaust valve side is eliminated, and the speed of the intake gas flow in the stroke volume becomes uniform. As a result, the formation of the eddies in the stroke volume can be prevented, and the air and rich mixture, which are successively drawn in, are properly stratified in the order in which they are drawn in.

The barrier part 24 in the embodiment of FIG. 9, may be formed with variations in shape such as those aforementioned with reference to FIGS. 1 through 3 and FIGS. 6 through 8. Namely, the barrier part 24 may be formed as a unit with the cylinder block 14. Also, the barrier part 24 may be formed as an independent part from the cylinder head 13a or the cylinder block 14. Further, the barrier part 24 may have an upwardly inclined or curved shape, as shown in FIGS. 2 and 3. Still further, the barrier part 24 may be formed with a plurality of holes which have the shape and arrangement as described with reference to FIG. 6.

The advantages of the present invention are as follows.

Firstly, since the stratification of the air and rich mixture in the carburetor single chamber type stratified charge combustion system becomes more positive, the quantity of injurious exhaust gases, such as CO, HC (Hydro-Carbons), and NO, emitted from the engine is reduced. This is an important advantage from the point of view of prevention of pollution by exhaust gases.

Also, due to the improved stratification, since a rich mixture layer is reliably formed around the ignition plug, the ignition characteristics are improved, and the mis-firing limits or usable air-fuel ratios are widened.

Further, since the said barrier part has the effect of constructionally increasing the heat transmission area of the interior of the combustion chamber, and thus improving the heat transmission and lowering the temperature of combustion, it thereby further reduces the quantity of nitrogen oxides (NO) in the exhaust gas.

Yet further, owing to the simplicity of the construction of the combustion chamber in accordance with the present invention, it is inexpensive, which means a considerable advantage. The present invention is also practically very advantageous in that it can easily be embodied in conventional existing engines without extensive reconstruction.

We claim:

1. A spark ignition, four-stroke cycle, internal combustion engine of the type that includes a cylinder block with at least one cylinder, a piston in the cylinder reciprocable through a predetermined stroke volume, a cylinder head formed with a single-chamber combustion space opening into the stroke volume of the cylinder and an intake port equipped with a poppet-type intake valve opening directly into the chamber, and means for supplying a stratified charge of air and carbureted fuel-rich mixture in sequence through the intake port during the intake stroke of the piston, but the configuration of the passageway formed by the intake port, the poppet-type intake valve and the single-chamber combustion space being such that the velocity of the charge entering the stroke volume of the cylinder is higher adjacent to at least a portion of the circumferential wall of the cylinder than it is in the rest of the cylinder, thereby causing undesirable mixing of the stratified charge, wherein the improvement comprises:

a peripheral barrier located near the opening from the combustion chamber into the stroke volume of the cylinder and projecting inwardly from at least the portion of the circumferential wall of the cylinder in the way of the higher velocity portion of the incoming charge in order to create approximately uniform velocity of the incoming charge at all points on a plane normal to the direction of flow past the barrier.

2. A spark ignition engine according to claim 1, wherein said barrier is constructed as a unit with the constructional part of the combustion chamber.

3. A spark ignition engine according to claim 2, wherein said barrier is formed integral with the cylinder head.

4. A spark ignition engine according to claim 2, wherein said barrier is formed integral with the cylinder block.

5. A spark ignition engine according to claim 1, wherein said barrier is provided with a plurality of holes, the shape and arrangement of said holes being such that the resistance to passage of the intake gas is high in the neighbourhood of the periphery and comparatively lower in the region of the inside edge of the barrier.

6. A spark ignition engine according to claim 5, wherein the density of the hole distribution is constant, while the size of the holes is less in the neighbourhood of the periphery and larger in the neighbourhood of the inside edge of the barrier.

7. A spark ignition engine according to claim 5, wherein the size of the holes is constant, while the hole distribution is sparse in the neighbourhood of the periphery and dense in the neighbourhood of the inside edge of the barrier.

8. A spark ignition engine according to claim 5, wherein the holes are small and sparse in the neighbourhood or the periphery and large and dense in the neighbourhood of the inside edge of the barrier.

9. A spark ignition engine according to claim 1 in which the surface of the combustion chamber is approximately hemispherical, and the intake port is offset to one side of the central axis of the cylinder and opens into the chamber obliquely with respect to a plane perpendicular to the central axis so that the incoming charge from the side of the port near the central axis flows along said hemispherical surface, wherein the inward extent of the barrier is substantially constant around at least a portion of the circumference of the chamber wall including the side opposite to the intake valve side, so that the barrier has basically an annular shape in said portion with an inner edge of predetermined diameter.

10. A spark ignition engine according to claim 9 wherein the inward extent of the barrier for a portion of the circumference of the chamber wall on the intake valve side differs from the constant inward extent of the barrier for the remainder of the circumference.

11. A spark ignition engine according to claim 9 wherein the barrier is interrupted for a portion of the circumference of the chamber wall on the intake valve side.

12. A spark ignition engine according to claim 9 wherein the inward extent of the barrier is variable for a portion of the circumference of the chamber wall on the intake valve side.

13. A spark ignition engine according to claim 1 wherein the central surface of the combustion chamber is substantially flat and perpendicular to the central axis of the cylinder, the intake port being offset to one side of the central axis and opening into said central surface such that the incoming charge is deflected substantially uniformly to flow along the surface of the combustion chamber, the flow path to the intake side of the stroke volume of the cylinder being shorter than the flow path to the opposite side so that the velocity on the intake side of the cylinder is higher than on the opposite side, wherein the barrier is wider along the periphery of the cylinder wall on the intake side than on the opposite side.

14. A spark ignition engine according to claim 1 wherein the barrier is flat and lies in a plane perpendicular to the cylinder axis.

15. A spark ignition engine according to claim 1 wherein the barrier is frusto-conical with its larger end opening into the stroke volume of the cylinder, the inclination of the barrier surface being approximately 30° – 45° with respect to a plane perpendicular to the cylinder axis.

16. A spark ignition engine according to claim 1 wherein the barrier is in the form of an annular ring having a curved diverging surface opening into the stroke volume of the cylinder.

17. A spark ignition engine according to claim 1 wherein the barrier comprises an independent member having its periphery clamped between the cylinder block and cylinder head.

* * * * *